United States Patent [19]

Serrill

[11] 3,805,435
[45] Apr. 23, 1974

[54] FISHING LURE RETRIEVER
[76] Inventor: DeHart M. Serrill, 3745 N. Main, Kansas City, Mo.
[22] Filed: July 28, 1972
[21] Appl. No.: 276,136

[52] U.S. Cl. .................................................. 43/17.2
[51] Int. Cl. .............................................. A01k 97/00
[58] Field of Search .......................... 43/17.2, 42.74

[56] References Cited
UNITED STATES PATENTS
2,609,632   9/1952   Davis ................................ 43/17.2
3,643,366   2/1972   Gates ............................... 43/17.2

*Primary Examiner*—Louis G. Mancene
*Assistant Examiner*—Robert F. Cutting
*Attorney, Agent, or Firm*—Lowe, Kokjer, Kircher, Wharton & Bowman

[57] ABSTRACT

A fishing lure retriever which assures that there will be no damage to the fishing line during use is provided by the present invention. The retriever is designed to recover a lure hooked on an obstacle beneath the surface without breaking the line and in most cases without permanent damage to the lure. A negative buoyancy member has an elongated cylindrical body section and a frustoconical nose section for maximum effectiveness in traveling to the stuck lure over obstacles in the water. An elongated linear probe extends from the nose section in the direction of the lure to be retrieved. This probe has secured to its end, structure presenting a plurality of side-by-side spaced apart convolutions for supporting the retriever on the fishing line. At the opposite end of the retriever, structure extends from the cylindrical body section to again present a plurality of convolutions for supporting the other end of the retriever on the fishing line. A guide line is secured to the cylindrical body section in spaced relationship to the last mentioned structure for controlling sliding movement of the retriever relative to the fishing line. Since the center of gravity of the retriever is spaced from the plane of the fishing line, the retriever is able to exert a force against the lure which is in a direction traversing the plane of the force transferred through the fishing line.

3 Claims, 3 Drawing Figures

FISHING LURE RETRIEVER

This invention relates to an improved retriever for recovering a fishing lure caught on an obstacle beneath the surface of a body of water.

Fishing lure retrievers are well known to anyone familiar with the fishing tackle art. Numerous attempts have been made to provide a retriever for a lure caught below the surface to prevent a line from becoming broken when a lure is attempted to be retrieved. These prior art devices have, however, been largely unsuccessful for numerous reasons. In those instances where retrievers have been constructed to actually direct their force along a line in the same plane as the fishing line, it has been found that there is a jamming and beating of the caught lure which frequently does not result in freeing of the lure. In those instances where retrievers have been clamped onto the fishing line in offset relationship thereto, it has been found that the means heretofore used to clamp the retriever onto the line frequently results in damage to the line.

Accordingly, it is one of the primary objects of the present invention to provide a lure retriever which can be secured to a fishing line in a manner which assures that there can be no damage to the line during installation.

Another one of the objects of the present invention is to provide a retriever having structure capable of sliding off of obstacles thereby permitting the retriever to reach in behind an obstacle to an extent not previously possible.

It is also an aim of this invention to provide a retriever having an elongated linear probe for reaching into previously inaccessible areas while also providing a leverage arm which may be pivoted about a fulcrum point presented by the obstacle on which the lure is caught to thereby assist in extracting the lure.

My invention also has as one of its objectives a fishing lure retriever as set forth in the foregoing objects wherein the force delivered to the lure by the retriever traverses the plane of the fishing line thereby assuring delivery of a "glancing" blow to the lure for facilitating its removal.

Other objects of the invention will be made clear or become apparent from the following description and claims when read in light of the accompanying drawing.

Figure 1:
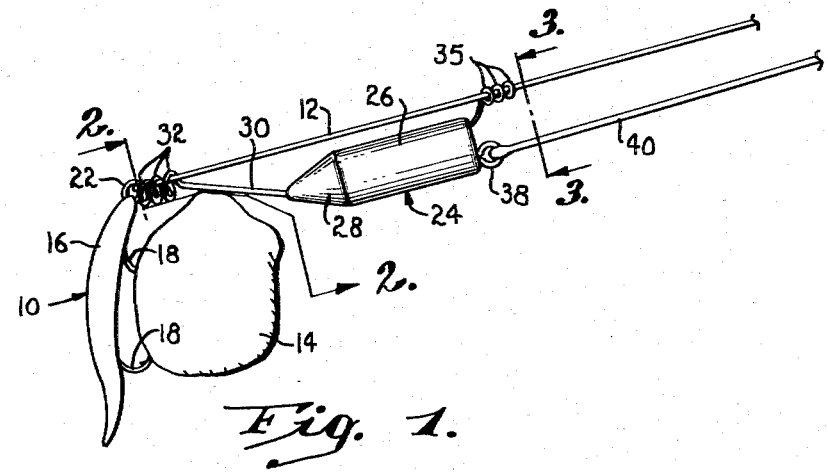
FIG. 1 is a side elevational view of a fishing lure caught on an obstacle with the retriever of the present invention being utilized to free the lure.

In FIG. 1, a fishing lure designated generally by the numeral 10 and secured to a fishing line 12 is shown caught on an obstacle 14. Lure 10 comprises a generally elliptically shaped body unit 16 having a pair of hooks 18 depending therefrom. Eyelet structure 22 is disposed at the end of unit 16 opposite hook 18 to provide means for securing fishing line 12 to the lure.

Figure 2:
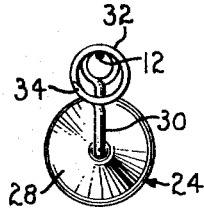
FIG. 2 is an end elevational view looking in the direction of the forward probe of the retriever.

The retriever of the present invention is designated generally by the numeral 24 and comprises a negative buoyancy member in the form of an elongated cylindrical body section 26 which is integral with and merges into a tapered nose section 28. Projecting from the apex of the nose section is an elongated linear probe 30 which extends at an angle away from the longitudinal axis of the negative buoyancy member in a plane intersecting the longitudinal plane of teh fishing line 12. Dosposed on the forward end of probe 30 and merging into the latter in integral relationship is a strand-like winding presenting a plurality of spaced apart, spirally wound convolutions 32. As best understood from viewing FIG. 2, the forwardmost convolution 32 has a terminal end 34 which presents an opening for insertion of fishing line 12 through the windings of the convolutions as shown in FIG. 1.

Figure 3:
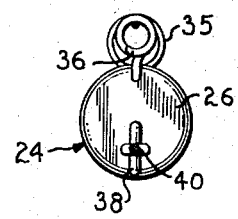
FIG. 3 is a partial cross-sectional end elevational view taken along line 3—3 of FIG. 1.

Extending from the end of body section 26 in generally the opposite direction to probe 30 is a second structure presenting a second set of spirally wound spaced apart convolutions 35. As best illustrated in FIG. 3, the rearwardmost convolution 35 terminates in an end 36 which provides an opening for insertion of line 12 through the convolutions as illustrated in FIG. 1.

Also projecting from the end of section 26 is an eyelet 38 for securing a guide line 40 to the negative buoyancy member at a point below the point where the structure presenting convolutions 34 is presented.

In use, when lure 10 becomes caught on an obstacle such as 14 beneath the surface of a body of water and forces exerted by pulling on fishing line 12 do not result in freeing the lure, retriever 24 is placed on line 12 and guide line 40 is utilized to control movement of the retriever down line 12 until it reaches the caught lure 10. It will be appreciated that convolutions 32 and 34 provide means for supporting the retriever on the fishing line without any danger whatsoever of exposing the line to damaging forces. This is of particular concern with modern day synthetic mono filament lines which can be easily scraped or scratched if any kind of clamping action is applied to the line. It has been found desirable to provide at least two complete convolutions such as 32 and 34 for supporting retriever 24 from opposite ends and distributing the weight of the retriever over a sufficiently large area. On the other hand, it has been found that the performance of retriever 24 is greatly improved over the prior art devices by avoiding having any convolutions 32 in the area of probe 30. This will be discussed in greater detail below.

As retriever 24 travels down the line 12, it reaches lure 10 and obstacle 14 against which the lure is caught. The relatively long linear probe 30 can easily pass over obstacle 14 and reach in behind the obstacle to a degree not heretofore possible. Manifestly, because the center of gravity of retriever 24 is beneath the line of force exerted through line 12, and because probe 30 extends in a plane intersecting the plane of line 12, the force resulting from retriever 20 exerts a sideways or glancing blow against lure 10. It has been found that this is most effective in displacing the lure from an obstacle. In addition, when probe 30 is resting on the obstacle surface as shown in FIG. 1, the probe may be utilized as a lever which may be moved up and down about a fulcrum point presented by the area of contact of obstacle 14 with the probe. This again allows for highly effective utilization of the forces applied by the retriever and is to be contrasted with the random "banging and hitting" which has characterized similar devices of the prior art. It is also an important feature of the present invention that guide line 40 permits retriever 24 to be moved 360° about the caught lure 10 to apply a dislodging force from the most effective position.

Having thus described the invention, what is claimed as new and desired to be secured by Letters Patent is:

1. A retriver for a fishing lure secured to a fishing line when a hook is caught on an object, said retriever comprising:

a negative buoyancy member, said member comprising an elongated cylindrical body section and a tapered nose section secured to the body section;

an elongated unitary linear probe projecting from the tapered nose section in one direction and extending at an angle away from the longitudinal axis of the member in a plane intersecting the longitudinal plane of the fishing line;

first means comprising a plurality of convolutions with an open end for insertion of said line coupled with said probe at the end of the latter for partially supporting said member for travel along the line, for sliding movement relative to the latter while accommodating free pivotal movement about the line, said first means permitting insertion of said line without exposing the line to damaging forces;

second means comprising a plurality of convolutions with an open end for insertion of said line coupled with the member at the opposite end of the latter from said probe for partially supporting said member on the line for sliding movement relative to the latter while accommodating free pivotal movement about the line, said second means permitting insertion of said line without exposing the line to damaging forces, said first and second means both being disposed above the center of gravity of said member when the latter is in a horizontal position to thereby support the member in spaced relationship to the line; and means for securing a guide line to the member at said opposite end for con-trolling the movement of the member relative to the fishing line, whereby said member may be directed along the line to exert a force against said lure opposite to the line of force exerted on the lure by pulling on said line.

2. The invention of claim 1, wherein said second means and said guide line securing means extend from the end of said cylindrical body section, said guide line being secured to the body section at a point below the second means.

3. The invention of claim 2, wherein the length of said probe is at least twice the length of the convolutions comprising said first means.

* * * * *